United States Patent
Hauck et al.

(10) Patent No.: US 7,995,606 B1
(45) Date of Patent: Aug. 9, 2011

(54) FLY-BY AND ACK-ACCELERATED ARBITRATION FOR BROADCAST PACKETS

(75) Inventors: Jerrold V. Hauck, Windermere, FL (US); Prashant Kanhere, Cupertino, CA (US); William S. Duckwall, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 2059 days.

(21) Appl. No.: 10/728,185

(22) Filed: Dec. 3, 2003

(51) Int. Cl.
*H04J 3/02* (2006.01)
(52) U.S. Cl. ........................................................ 370/462
(58) Field of Classification Search .......... 370/449–451, 370/257, 461, 462, 528; 710/119, 100, 107
See application file for complete search history.

(56) References Cited

U.S. PATENT DOCUMENTS

| | | | |
|---|---|---|---|
| 4,156,798 A | 5/1979 | Doelz | 179/15 AL |
| 4,194,113 A | 3/1980 | Fulks et al. | 371/20 |
| 4,680,755 A * | 7/1987 | Reames | 370/451 |
| 5,014,262 A | 5/1991 | Harshavardhana | 370/16 |
| 5,274,631 A | 12/1993 | Bhardwaj | 370/60 |
| 5,321,812 A | 6/1994 | Benedict et al. | 709/223 |
| 5,343,461 A | 8/1994 | Barton et al. | 370/13 |
| 5,394,556 A | 2/1995 | Oprescu | 395/800 |
| 5,406,643 A | 4/1995 | Burke et al. | 395/200 |
| 5,452,330 A | 9/1995 | Goldstein | 375/257 |
| 5,490,253 A | 2/1996 | Laha et al. | 395/304 |
| 5,495,481 A * | 2/1996 | Duckwall | 370/462 |
| 5,524,254 A | 6/1996 | Morgan et al. | 395/800 |
| 5,539,390 A | 7/1996 | Nagano et al. | 340/825.07 |
| 5,541,670 A | 7/1996 | Hanai | 348/705 |
| 5,568,641 A | 10/1996 | Nelson et al. | 395/700 |
| 5,583,922 A | 12/1996 | Davis et al. | 379/96 |
| 5,621,659 A | 4/1997 | Matsumoto et al. | 364/514 R |
| 5,630,173 A | 5/1997 | Oprescu | 395/860 |
| 5,632,016 A | 5/1997 | Hoch et al. | 395/200.02 |
| 5,640,595 A | 6/1997 | Baugher et al. | 395/830 |
| 5,642,515 A | 6/1997 | Jones et al. | 395/727 |

(Continued)

FOREIGN PATENT DOCUMENTS

EP 1 085 706 A2 3/2001

(Continued)

OTHER PUBLICATIONS

Bregni et al., Jitter Testing Technique and Results at VC-4 Desynchronizer Output of SDH Equipment, *IEEE International Conference on Communications*, vol. 3, pp. 1407-1410, May 12, 1994.

(Continued)

*Primary Examiner* — Kwang B Yao
*Assistant Examiner* — Kenan Cehic
(74) *Attorney, Agent, or Firm* — Gazdzinski & Associates, P.C.

(57) ABSTRACT

A method for administering transmission of a first type of packets and a second type of packets over a serial bus. In one embodiment, the method comprises: if there is a packet of a second type to be sent, then concatenating the packet of the second type to a plurality of packets of the first type and sending the plurality of packets of the first type followed by the concatenated packet of the second type; and if there is no packet of the second type to be sent, then concatenating a bogus ack packet to the plurality of packets of the first type and sending the plurality of packets of the first type followed by the concatenated bogus ack packet.

67 Claims, 4 Drawing Sheets

U.S. PATENT DOCUMENTS

| | | | |
|---|---|---|---|
| 5,654,657 A | 8/1997 | Pearce | 327/163 |
| 5,684,715 A | 11/1997 | Palmer | 364/514 C |
| 5,701,476 A | 12/1997 | Fenger | 395/652 |
| 5,701,492 A | 12/1997 | Wadsworth et al. | 395/712 |
| 5,706,278 A | 1/1998 | Robillard et al. | 370/222 |
| 5,712,834 A | 1/1998 | Nagano et al. | 369/19 |
| 5,719,862 A | 2/1998 | Lee et al. | 1/355 |
| 5,754,765 A | 5/1998 | Danneels et al. | 395/200.1 |
| 5,764,930 A | 6/1998 | Staats | 710/107 |
| 5,784,648 A | 7/1998 | Duckwall | 395/860 |
| 5,802,048 A | 9/1998 | Duckwall | 370/389 |
| 5,802,057 A * | 9/1998 | Duckwall et al. | 370/408 |
| 5,802,365 A | 9/1998 | Kathail et al. | 395/681 |
| 5,805,073 A | 9/1998 | Nagano et al. | 369/19 |
| 5,809,331 A | 9/1998 | Staats et al. | 395/830 |
| 5,826,027 A | 10/1998 | Pedersen et al. | 395/200.51 |
| 5,832,298 A | 11/1998 | Sanchez et al. | 395/828 |
| 5,835,761 A | 11/1998 | Ishii et al. | 395/653 |
| 5,845,152 A | 12/1998 | Anderson et al. | 395/872 |
| 5,867,730 A | 2/1999 | Leyda | 395/830 |
| 5,875,301 A | 2/1999 | Duckwall et al. | 395/200.51 |
| 5,923,663 A | 7/1999 | Bontemps et al. | 370/445 |
| 5,930,480 A | 7/1999 | Staats | 395/200.74 |
| 5,935,208 A | 8/1999 | Duckwall et al. | 709/221 |
| 5,938,764 A | 8/1999 | Klein | 713/1 |
| 5,940,600 A | 8/1999 | Staats et al. | 395/287 |
| 5,954,796 A | 9/1999 | McCarty | 709/222 |
| 5,968,152 A | 10/1999 | Staats | 710/104 |
| 5,970,052 A | 10/1999 | Lo et al. | 370/241 |
| 5,987,605 A | 11/1999 | Hill et al. | 713/2 |
| 5,991,842 A | 11/1999 | Takayama | 710/105 |
| 6,032,202 A | 2/2000 | Lea et al. | 710/8 |
| 6,032,261 A | 2/2000 | Hulyalkar | 713/400 |
| 6,038,234 A | 3/2000 | LaFollette et al. | 370/443 |
| 6,038,625 A | 3/2000 | Ogino et al. | 710/104 |
| 6,070,187 A | 5/2000 | Subramaniam et al. | 709/220 |
| 6,073,206 A | 6/2000 | Piwonka et al. | 711/102 |
| 6,091,726 A | 7/2000 | Crivellari et al. | 370/392 |
| 6,115,764 A | 9/2000 | Chisholm et al. | 710/100 |
| 6,122,248 A | 9/2000 | Murakoshi et al. | 370/216 |
| 6,131,129 A | 10/2000 | Ludtke et al. | 710/5 |
| 6,131,134 A | 10/2000 | Huang et al. | 710/103 |
| 6,131,163 A | 10/2000 | Wiegel | 713/201 |
| 6,133,938 A | 10/2000 | James | 348/8 |
| 6,138,196 A | 10/2000 | Takayama et al. | 710/105 |
| 6,141,702 A | 10/2000 | Ludtke et al. | 710/5 |
| 6,141,767 A | 10/2000 | Hu et al. | 714/1 |
| 6,145,018 A | 11/2000 | LaFollette et al. | 710/8 |
| 6,157,972 A | 12/2000 | Newman et al. | 710/100 |
| 6,160,796 A | 12/2000 | Zou | 370/257 |
| 6,167,532 A | 12/2000 | Wisecup | 714/23 |
| 6,173,327 B1 | 1/2001 | De Borst et al. | 709/231 |
| 6,192,189 B1 | 2/2001 | Fujinami et al. | 386/96 |
| 6,199,119 B1 | 3/2001 | Duckwall et al. | 710/8 |
| 6,202,210 B1 | 3/2001 | Ludtke | 725/20 |
| 6,212,171 B1 | 4/2001 | LaFollette et al. | 370/257 |
| 6,212,633 B1 | 4/2001 | Levy et al. | 713/153 |
| 6,219,697 B1 | 4/2001 | Lawande et al. | 709/221 |
| 6,233,615 B1 | 5/2001 | Van Loo | 709/224 |
| 6,233,624 B1 | 5/2001 | Hyder et al. | 709/327 |
| 6,243,778 B1 | 6/2001 | Fung et al. | 710/113 |
| 6,247,063 B1 | 6/2001 | Ichimi et al. | 709/250 |
| 6,247,083 B1 | 6/2001 | Hake et al. | 710/107 |
| 6,253,114 B1 | 6/2001 | Takihara | 700/83 |
| 6,253,255 B1 | 6/2001 | Hyder et al. | 709/321 |
| 6,256,059 B1 | 7/2001 | Fichtner | 348/222.1 |
| 6,260,063 B1 | 7/2001 | Ludtke et al. | 709/224 |
| 6,266,334 B1 * | 7/2001 | Duckwall | 370/397 |
| 6,266,344 B1 | 7/2001 | Fujimori et al. | 370/468 |
| 6,266,701 B1 | 7/2001 | Sridhar et al. | 709/232 |
| 6,275,889 B1 | 8/2001 | Saito | 710/129 |
| 6,282,597 B1 | 8/2001 | Kawamura | 710/105 |
| 6,292,840 B1 | 9/2001 | Blomfield-Brown et al. | 709/247 |
| 6,295,479 B1 | 9/2001 | Shima et al. | 700/83 |
| 6,308,222 B1 | 10/2001 | Krueger et al. | 709/247 |
| 6,311,228 B1 | 10/2001 | Ray | 709/321 |
| 6,314,461 B2 | 11/2001 | Duckwall et al. | 709/221 |
| 6,343,321 B2 | 1/2002 | Patki et al. | 709/227 |
| 6,345,315 B1 | 2/2002 | Mishra | 709/329 |
| 6,347,362 B1 | 2/2002 | Schoinas et al. | 711/147 |
| 6,353,868 B1 | 3/2002 | Takayama et al. | 710/129 |
| 6,356,558 B1 * | 3/2002 | Hauck et al. | 370/450 |
| 6,363,085 B1 | 3/2002 | Samuels | 370/502 |
| 6,373,821 B2 | 4/2002 | Staats | 370/252 |
| 6,385,679 B1 | 5/2002 | Duckwall et al. | 710/119 |
| 6,405,247 B1 | 6/2002 | Lawande et al. | 709/221 |
| 6,411,628 B1 | 6/2002 | Hauck et al. | 370/447 |
| 6,418,150 B1 | 7/2002 | Staats | 370/503 |
| 6,425,019 B1 | 7/2002 | Tateyama et al. | 710/11 |
| 6,426,962 B1 | 7/2002 | Cabezas et al. | 370/516 |
| 6,442,630 B1 | 8/2002 | Takayama et al. | 710/105 |
| 6,446,142 B1 | 9/2002 | Shima et al. | 710/16 |
| 6,452,975 B1 | 9/2002 | Hannah | 375/257 |
| 6,457,086 B1 | 9/2002 | Duckwall | 710/305 |
| 6,466,982 B1 | 10/2002 | Ruberg | 709/227 |
| 6,496,862 B1 | 12/2002 | Akatsu et al. | 709/224 |
| 6,513,085 B1 | 1/2003 | Gugel et al. | 710/305 |
| 6,519,657 B1 | 2/2003 | Stone et al. | 710/10 |
| 6,529,522 B1 | 3/2003 | Ito et al. | 370/466 |
| 6,574,588 B1 | 6/2003 | Shapiro et al. | 703/24 |
| 6,587,904 B1 | 7/2003 | Hauck et al. | 710/107 |
| 6,591,300 B1 | 7/2003 | Yurkovic | 709/226 |
| 6,606,320 B1 | 8/2003 | Nomura et al. | 370/395.1 |
| 6,618,750 B1 | 9/2003 | Staats | 709/209 |
| 6,618,785 B1 | 9/2003 | Whitby-Strevens | 710/305 |
| 6,628,607 B1 | 9/2003 | Hauck et al. | 370/216 |
| 6,636,914 B1 | 10/2003 | Teener | 710/240 |
| 6,643,714 B1 | 11/2003 | Chrysanthakopoulos | 710/8 |
| 6,671,768 B1 | 12/2003 | Brown | 711/102 |
| 6,904,044 B2 * | 6/2005 | Duckwall et al. | 370/408 |
| 2001/0001151 A1 | 5/2001 | Duckwall et al. | 710/8 |
| 2001/0019561 A1 | 9/2001 | Staats | 370/487 |
| 2001/0024423 A1 | 9/2001 | Duckwall et al. | 370/254 |
| 2002/0085581 A1 | 7/2002 | Hauck et al. | 370/442 |
| 2002/0101231 A1 | 8/2002 | Staats | 324/126 |
| 2002/0103947 A1 | 8/2002 | Duckwall et al. | 710/19 |
| 2002/0188780 A1 | 12/2002 | Duckwall | 710/105 |
| 2002/0188783 A1 | 12/2002 | Duckwall et al. | 710/119 |
| 2003/0037161 A1 | 2/2003 | Duckwall et al. | 709/223 |
| 2003/0055999 A1 | 3/2003 | Duckwall et al. | 709/236 |
| 2003/0179719 A1 * | 9/2003 | Kobayashi et al. | 370/282 |
| 2003/0202539 A1 * | 10/2003 | Fukunaga et al. | 370/489 |
| 2004/0151153 A1 * | 8/2004 | Henry et al. | 370/346 |
| 2004/0246959 A1 * | 12/2004 | Duckwall et al. | 370/389 |

FOREIGN PATENT DOCUMENTS

EP        1 085 706 A3      10/2002

OTHER PUBLICATIONS

"Information technology-Microprocessor systems—Control and Status Registers (CSR) Architecture for microcomputer buses", ANSI/IEEE Standard 1212, The Institute of Electrical and Electronics Engineers, Inc. pp. 1-122, 1994 Edition.

Bregni et al., Jitter Testing Technique and Results at VC-4 Desynchronizer Output of SDH Equipment, *IEEE Transactions on Instrumentation and Measurement*, vol. 44, Issue 3, pp. 675-678, Jun. 1995.

"IEEE Standard for a High Performance Serial Bus", IEEE Standard 1394-1995, Institute of Electrical and Electronics Engineers, Inc., pp. 1-384, approved Jul. 22, 1996.

Shiwen et al., Parallel Positive Justification in SDH C_4 Mapping, *IEEE International Conference on Communications*, vol. 3, pp. 1577-1581, Jun. 12, 1997.

"AV/C Digital Interface Command Set General Specification, Rev. 3.0", 1394 Trade Association, pp. 4-5, 20-34, Apr. 15, 1998.

"Enhancements to the AV/C General Specification 3.0 Version 1.0FC1", 1394 Trade Association, pp. 4, 6-17, Nov. 5, 1998.

"Information Technology-Fibre Channel-Methodologies for Jitter Specification", NCITS TR-25-1999, Jitter Working Group Technical Report, Rev. 10, pp. 1-96, Jun. 9, 1999.

"P1394a Draft Standard for a High Performance Serial Bus (Supplement)", Draft 3.0, Institute of Electrical and Electronics Engineers, Inc., pp. 1-187, Jun. 30, 1999.

"IEEE Standard for a High Performance' Serial Bus-Amendment 1", Institute of Electrical and Electronics Engineers, Inc., pp. 1-196, approved Mar. 30, 2000.

P1394b IEEE Draft Standard for a High Performance Serial Bus (High Speed Supplement) P1394b Draft 1.3.3, Institute of Electrical and Electronics Engineers, Inc., pp. 1-408, Nov. 16, 2001.

"IEEE Standard for a High Performance Serial Bus-Amendment 2", Institute of Electrical and Electronics Engineers, Inc., pp. 1-369, 2002 (no month).

* cited by examiner

FLY-BY AND ACK-ACCELERATED ARBITRATION FOR BROADCAST PACKETS

BACKGROUND OF THE INVENTION

A "bus" is a collection of signals interconnecting two or more electrical devices that permits one device to transmit information to one or more other devices. There are many different types of busses used in computers and computer-related products. Examples include the Peripheral Component Interconnect ("PCI") bus, the Industry Standard Architecture ("ISA") bus and the Universal Serial Bus ("USB"), to name a few. Bus operation is usually defined by a standard that specifies various concerns such as the electrical characteristics of the bus, how data is to be transmitted over the bus, how requests for data are acknowledged, and the like. Using a bus to perform an activity, such as transmitting data, requesting data, etc., is generally called running a "cycle." Standardizing a bus protocol helps to ensure effective communication between devices connected to the bus, even if such devices are made by different manufacturers. Any company wishing to make and sell a device to be used on a particular bus, provides that device with an interface unique to the bus to which the device will connect. Designing a device to particular bus standard ensures that device will be able to communicate properly with all other devices connected to the same bus, even if such other devices are made by different manufacturers.

Thus, for example, an internal fax/modem (i.e., internal to a personal computer) designed for operation on a PCI bus will be able to transmit and receive data to and from other devices on the PCI bus, even if each device on the PCI bus is made by a different manufacturer.

According to most bus protocols, a device that needs to run a cycle on the bus must first gain control of the bus. Once the sending device has control of the bus, that device then can run its desired cycle, which may entail transmitting data to a receiving bus device. Often, more than one bus device may concurrently need to initiate a cycle on the bus. Bus protocols in which multiple devices may request control of the bus to run cycles usually implement some form of "arbitration" to efficiently decide which device to grant control of the bus among multiple devices requesting control. The prior art is replete with many types of arbitration schemes.

Currently, there is a market push to incorporate various types of consumer electronic equipment with a bus interface that permits such equipment to be connected to other equipment with a corresponding bus interface. For example, digital cameras, digital video recorders, digital video disks ("DVDs"), printers are becoming available with an IEEE 1394 bus interface. The IEEE ("Institute of Electrical and Electronics Engineers") 1394 serial interface (and all its variations, referred to collectively herein as "1394") describes a bus that permits a digital camera to be connected to a printer or computer so that an image acquired by the camera can be printed on the printer or stored electronically in the computer. Further, digital televisions can be coupled to a computer or computer network via an IEEE 1394 bus.

Asynchronous stream packets are a form of packet incorporated in 1394 to circumvent older link design packet-filtering limitations. Asynchronous stream packets are like isochronous packets, in that they share tcode "A," and the channel number is allocated in the usual way from the CHANNELS_AVAILABLE register of the isochronous resource manager.

However, asynchronous stream packets are transmitted during an asynchronous period, and are subject to the same arbitration requirements as other asynchronous packets (i.e. fairness). Like isochronous packets, there is no ack generated in response. Thus they behave like broadcast packets.

Existing links filter asynchronous stream packets out successfully in hardware. This is not the case for true broadcast packets, which have a destination ID of 63. Broadcast packets are passed upwards for software to filter, which causes overflows in some implementations.

Asynchronous streams are heavily used for internet protocol over 1394-compliant systems; on some 1394 systems, a sizable portion of the packets sent could be asynchronous stream packets. Because they are asynchronous packets, without following acknowledge packets, the bus is forced to wait for a full subaction gap before arbitration can begin for the next packet. This effectively drops bus efficiency back to pre-1394a-2000 levels. Ack acceleration, fly-by concatenations, link concatenations are all precluded by an asynchronous stream packet. After an asynchronous stream packet is transmitted on the bus, all nodes connected to the bus must wait for at least a subaction gap time period to pass before beginning bus arbitration.

SUMMARY OF THE INVENTION

The present invention solves the problems discussed above. In embodiments of the present invention, bus arbitration and/or packet transmission begins much sooner, without waiting for a gap timeout, thus greatly reducing the idle time on the 1394-compliant bus. This increases the effective bus bandwidth. While the present invention is described below with respect to asynchronous stream packets, it is to be understood by those skilled in the art that, unless otherwise stated, the present invention can be used with any asynchronous packets that do not require an unarbitrated response or ack packet sent in response to transmission of the packets, such as asynchronous broadcast packets, some PHY layer packets, and the like.

In an embodiment, the present invention provides a method for administering a serial bus, the bus facilitating communication between node devices connected to the bus and communicating over the bus in the form of packetized communication between node devices, the method comprising the acts of sending a stream of asynchronous stream packets; if there is an asynchronous packet to be sent, then concatenating the asynchronous packet to the asynchronous stream packets to be sent and sending the asynchronous stream packets followed by the asynchronous packet; and if there is no asynchronous packet to be sent, then concatenating a bogus ack packet to the asynchronous stream packets and sending the asynchronous stream packets and the concatenated bogus ack packet.

In another embodiment, the present invention provides a method for administering a serial bus, the bus facilitating communication between node devices connected to the bus and communicating over the bus in the form of packetized communication between node devices, the method comprising the acts of receiving an asynchronous stream packet; if there are more asynchronous stream packets to be sent, and if fly-by concatenation is permitted, then concatenate asynchronous stream packets; and if there are more asynchronous stream packets to be sent and fly-by concatenation is not permitted then arbitrate for control of the bus and sending packets.

In yet another embodiment, the present invention provides a method for administering a serial bus, the bus facilitating communication between node devices connected to the bus and communicating over the bus in the form of packetized communication between node devices, the method comprising the acts of receiving an asynchronous stream packet; if there is an asynchronous packet to be sent, and if fly-by concatenation is permitted, then concatenate the asynchronous packet to the asynchronous stream packet; if there is an asynchronous packet to be sent and fly-by concatentation is not permitted then arbitrate for the bus; and sending packets.

In yet another embodiment, the present invention provides a method for administering a serial bus, the bus facilitating communication between node devices connected to the bus and communicating over the bus in the form of packetized communication between node devices, the method comprising the acts of receiving an asynchronous stream packet; determining that there are no more asynchronous stream packets to be sent; determining that there are no asynchronous packets to be sent; if fly-by concatenation is permitted then concatenating a bogus ack packet; if fly-by concatenation is not permitted then arbitrating for the bus; and sending packets.

Other features and advantages of the present invention will become apparent to those skilled in the art upon reading the following detailed description and figures.

DETAILED DESCRIPTION OF THE INVENTION

Figure 1:
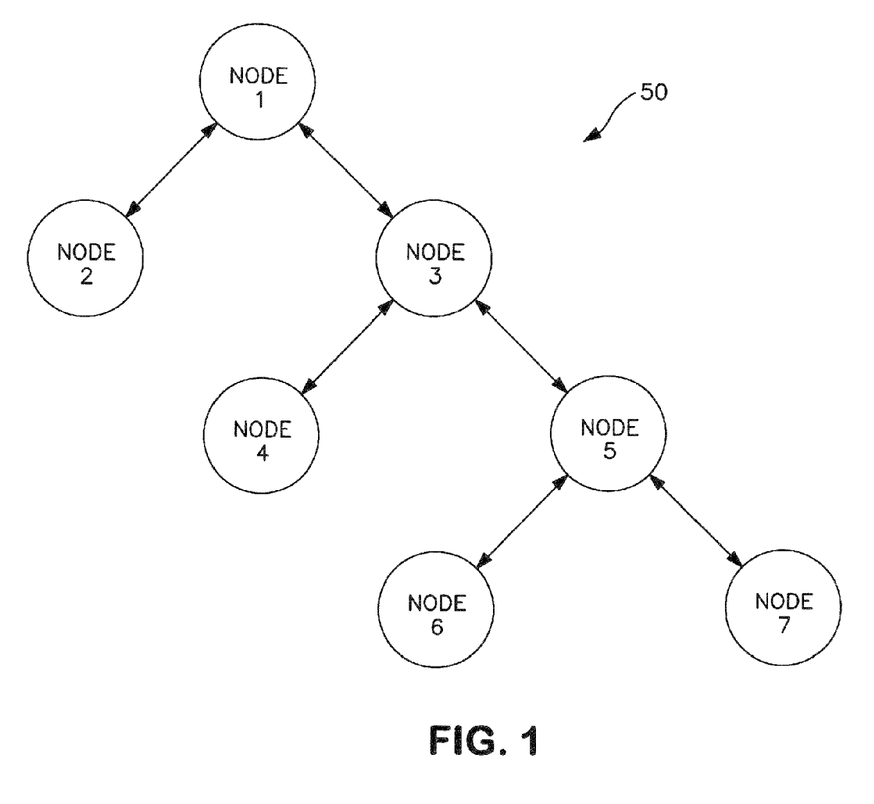
FIG. 1 is a high-level diagram in block diagram form of node devices connected to a high speed serial bus.

The present invention provides an improvement to arbitration on the IEEE 1394 bus, although the principles of the present invention may extend to other bus protocols, certainly other bus protocols experiencing a similar arbitration problem to that described below. To understand the nature of the problem solved by the present invention, the general structure and operation of an IEEE 1394 bus and arbitration scheme will now be provided. Referring to FIG. 1, an IEEE 1394 network 50 comprises one or more "nodes," node 1-node 7. A node represents an electronic device(s) with an IEEE 1394 bus interface. A node device may comprise a computer, a digital camera, a digital video recorder, a DVD player, or another type of device having a suitable bus interface. Each node couples to at least one other node. As shown in the exemplary architecture of FIG. 1, node 1 couples both to nodes 2 and 3. Node 3, in turn, couples to nodes 4, and 5 and node 5 also couples to nodes 6 and 7. In general, each node can transmit data to any other node in the network. For example, node 7 can transmit data to node 2, but the transmitted data will pass from node 7 to node 5 to node 3 to node 1 and then, to node 2. Each node contains hardware that implements physical layer services (referred to herein as a "phy" and denoted by the letter "P" in each illustrated node) and hardware that implements link layer services (referred to herein as a "link" and denoted by the letter "L" in each illustrated node).

Figure 2:
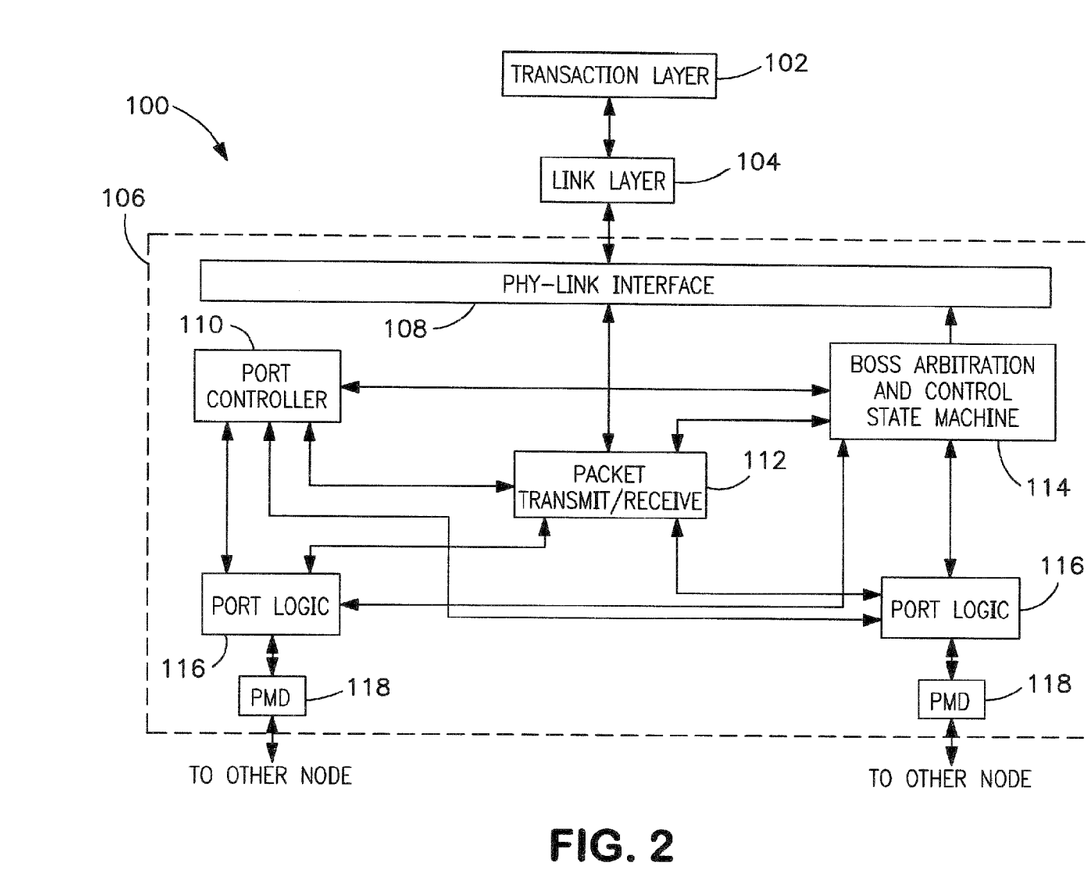
FIG. 2 is a high-level block diagram in block diagram form of a single node shown in FIG. 1.

Referring to FIG. 2, node 100 generally comprises three "layers": transaction layer 102, link layer 104 and physical layer 106 (referred to as a "PHY"). Transaction layer 102 implements the request-response protocol required to conform to the IEEE 1394 standard in accordance with known techniques. Link layer 104 supplies an acknowledgment to the transaction layer. Link layer 104 handles all packet transmission and reception responsibilities as well as the provision of cycle control for isochronous channels. The PHY 106 generally provides the initialization and arbitration services necessary to assure that only one node at a time is sending data and to translate the serial bus data stream and signal levels to those required by the link layer logic 104. PHY 106 also implements the arbitration scheme of the preferred embodiment of the invention.

Referring still to FIG. 2, PHY 106 preferably includes PHY-Link interface 108, port controller 110, packet transmit/receive 112, BOSS arbitration and control state machine 114, one or more port logic units 116, and physical media dependent ("PMD") electronics unit 118 for each port 116. Each port 116 can be used to couple the nodes to another node in the network. Multiple ports can be included within each node. Although two ports 116 are shown in the preferred embodiment of FIG. 2, the number of ports is not important for the present invention. Each port 116 couples to a PMD 118 that provides the necessary electrical interface to the particular physical communications medium. The physical communications medium may include any suitable type of medium such as Cat. 5 UTP, glass optical fiber, plastic optical fiber, beta-only electrical, bilingual electrical or DS-only electrical types of communication media. Each port 116 and its associated PMD 118 can be connected via a communication medium to another node in the network.

Port controller 110 generally controls the interface to another node in the network. Packet transmit/receive 112 generally receives and forwards all data packets. Packet transmit/receive 112 includes logic (not shown) to effectively control the flow of data cycles through PHY 106. Any node in the network can request ownership of the network to be the BOSS by transmitting an appropriate request to all of the neighboring nodes to which the requesting node connects. As such, each node in the network can receive requests from its neighboring nodes to be the BOSS and each node itself can request ownership of the bus. BOSS arbitration and control state machine 114 within a node receives all of the requests from its neighboring nodes in the network, via the various port logic units 116 and PMDs 118, as well as its own request to be BOSS. BOSS arbitration and control state machine 114 then prioritizes these various requests and sends out the highest priority request to all neighboring nodes through all active ports 116 not currently being used to transmit data. Eventually, the requests propagate their way to the current BOSS who grants ownership of the bus to the highest priority requests. Generally, IEEE 1394 supports two types of data transfers: asynchronous and isochronous. Asynchronous data transfers are sent to a specific address and an acknowledgment is returned to verify receipt of the data. Isochronous transfers guarantee data transfers at a predetermined rate that is particularly beneficial for time-critical, multimedia data transfers. Arbitration decisions are made separately for the asynchronous requests and isochronous requests. Accordingly, BOSS arbitration and control state machine 114 prioritizes the asynchronous requests separately from the isochronous requests and provides the highest priority request from each type (asynchronous and isochronous) to the ports not currently transmitting data for transmission to other nodes. The arbitration scheme described above is one style of arbitration used by 1394 PHY layers and is provided for illustrative purposes. Other arbitration schemes for variations on the 1394 standard have slight variations.

While the present invention is described below with reference to the IEEE 1394 protocols, the present invention in its various embodiments may also be utilized with asynchronous packet transmission performed in accordance with the discovery and enumeration protocol (DEP).

The present invention can be explained with reference to FIG. 1. The link that sends the asynchronous stream packet concatenates another packet onto the tail of the asynchronous stream packet. In an embodiment, the concatenated packet can be a cycle-start packet, or another asynchronous stream packet, or a normal asynchronous packet, or a bogus ack packet. An isochronous packet should not be concatenated onto an asynchronous stream packet, because by definition the asynchronous stream packet was transmitted during the asynchronous period of bus operation.

In the particular case where the link concatenates a bogus ack packet onto the asynchronous stream packet—the bogus ack packet serves to trigger the arbitration acceleration mechanisms available in 1394. Thus, other nodes can employ ack-accelerated arbitration and/or fly-by concatenation after passage of the bogus ack packet.

The bogus ack packet does not have to follow the prior-art convention that the second nibble is the complement of the first nibble. By not having a second nibble that is the compliment of the first nibble, the bogus ack packet causes the link hardware to filter it out so that it has no effect at that level. However, by definition in 1394, the PHY recognizes any 8-bit packet as an ack packet for the purposes of acceleration. Thus the present invention utilizes a packet that meets the requirements for recognition at one physical and/or transaction layer, but not at a different layer.

In an embodiment, originator concatenation is performed by link hardware. In embodiments, fly-by concatenation, fly-by concatenation of bogus ack packet, early arbitration and early arbitration for bogus ack packet are performed by PHY hardware. In an embodiment, originator bogus ack packet generation may be performed by both link hardware and PHY hardware. If the link performs the function, then the PHY defers, even if the node incorporates a PHY without the functionality of the present invention. Similarly, a PHY with the functionality of the present invention is able to concatenate the bogus ack packet, even if the link hardware has no knowledge of the action.

For accelerated bus arbitration upon detection of an asynchronous stream packet, the PHY saves the first quadlet of every passing packet, so that the tcode field can be checked. The PHY keeps track of whether it is in an isochronous period or not so that it doesn't start sending fair/pri packets during an isochronous period. In an embodiment, the start of an isochronous period can be by detection of a cycle start (where tcode=8). The end of the isochronous period can be detected at the occurrence of the first subaction (SA) gap.

In an embodiment, to identify other asynchronous packet types that do not require an unarbitrated response or ack packet sent in response to the transmission of the packet, the PHY can inspect the first quadlet of passing packets to determine the packet type.

Automatic sending of a bogus ack packet can be included in an embodiment of the present invention for the purpose of enabling ack accelerated arbitration after an asynchronous packet stream by an entity other than the sender of the asynchronous stream packet, e.g. the root node. One enlightened node on bus 50 can accelerate arbitration for the entire bus, even if populated by less enlightened hardware. A node can keep track of the isochronous period to keep from generating acks for isochronous packets. This approach works even if multiple nodes attempted to send the bogus ack packet, provided they arbitrate to send it rather than send it as an immediate packet or fly-by concatenating it). That way, one node wins arbitration and sends the bogus ack, and others get back to accelerated arbitrations after detecting an ack packet.

Figure 3:
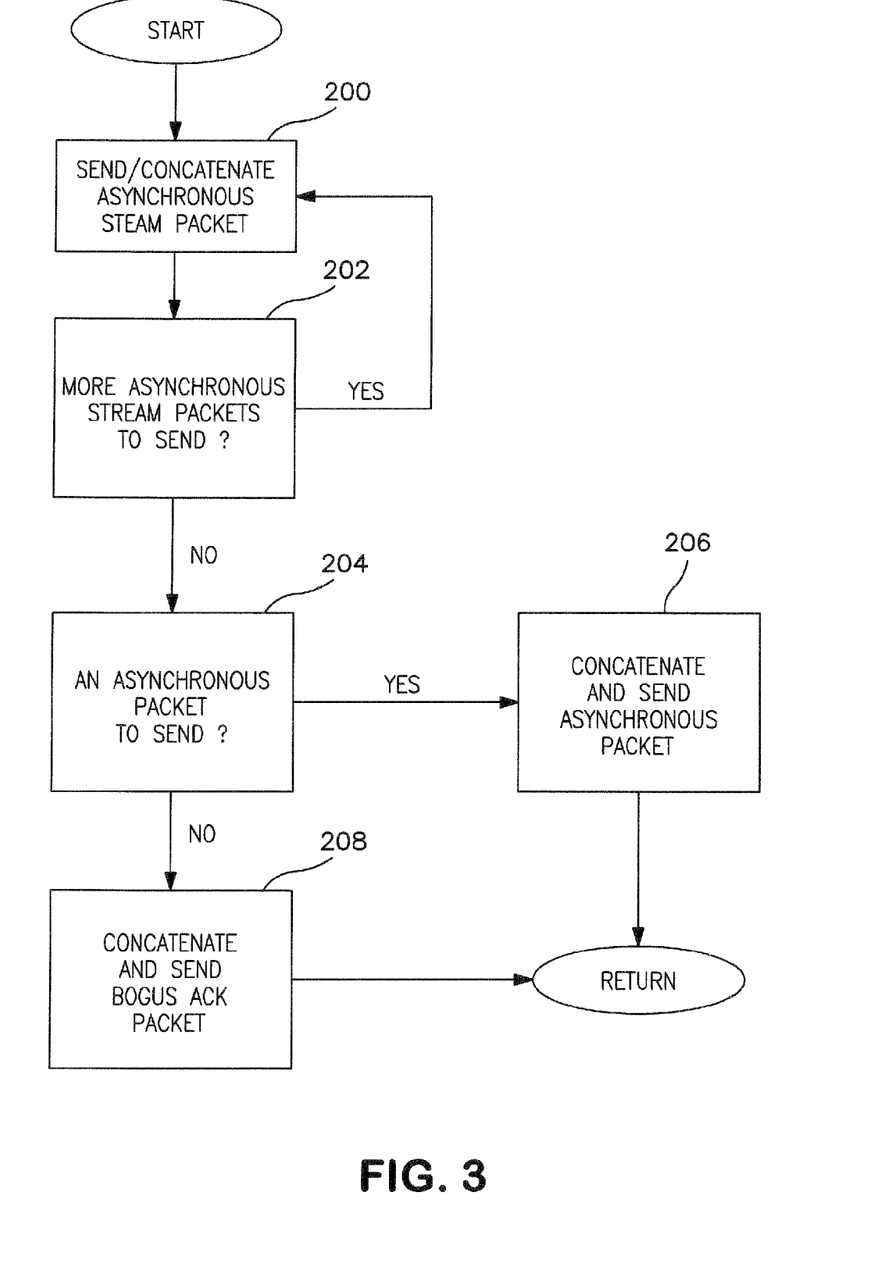
FIG. 3 is a diagram in flowchart form of acts performed by a node that is an originator of an asynchronous packet.

FIG. 3 illustrates in flow chart form a sequence of steps utilized in embodiments of the present invention by the originator of an asynchronous stream packet. Directing attention to acts 200 and 202, asynchronous stream packets are sent or concatenated to other asynchronous stream packets. At act 204, if there is an asynchronous packet to send after the asynchronous stream packets have been sent or concatenated, control transitions to act 206, where the asynchronous packet is concatenated and sent. However, if there is no asynchronous packet to send, a bogus ack packet is concatenated and sent at act 208.

Figure 4:
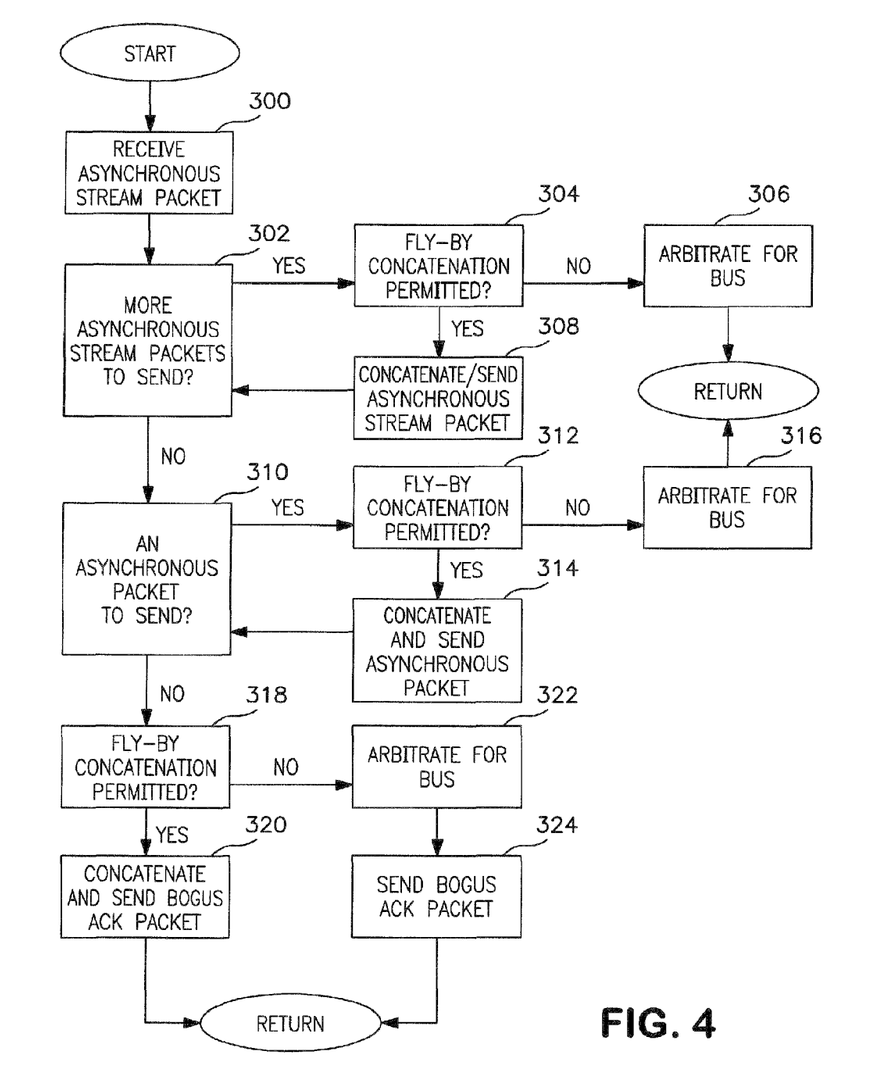
FIG. 4 is a diagram in flowchart form of acts performed by a node that receives an asynchronous packet.

FIG. 4 illustrates in flow chart sequences of acts performed by the receiver of an asynchronous stream packet. At act 300, an asynchronous stream packet is received. If there are more asynchronous stream packets to be sent (decision act 302), control proceeds to decision act 304, where a determination is made as to whether fly-by concatenation is permitted. If fly-by concatenation is permitted, control proceeds to act 308, where the asynchronous stream packet is concatenated and sent. Control then returns to act 302. If fly-by concatenation is not permitted, control transitions from act 304 to act 306, where bus 50 is arbitrated. At decision act 310, a determination is made as to whether there is an asynchronous packet to send. If there is an asynchronous packet to send, control proceeds to decision act 312, where a determination is made as to whether fly-by concatenation is permitted. If fly-by concatenation is permitted, control proceeds to act 314, where the asynchronous packet is concatenated and sent. However, if fly-by concatenation is not permitted, control proceeds to act 316, where bus 50 is arbitrated. Returning to decision act 310, if there is not an asynchronous packet to send, control transitions to decision act 318, where a determination is made as to whether fly-by concatenation is permitted. If fly-by concatenation is permitted, control proceeds to act 320, where a bogus ack packet is concatenated and sent. If fly-by concatenation is not permitted, control proceeds to act 322, where bus 50 is arbitrated, then a bogus ack packet is sent at act 324.

While various methodologies for administering a high-speed serial bus have been described and illustrated above, it is to be understood that various modifications can be made to embodiments of the present invention without departing from the spirit thereof.

What is claimed is:

1. A method for administering a serial bus, the bus facilitating communication between node devices connected to the bus and communicating over the bus in the form of packetized communication between said node devices, wherein a first type of packet comprises asynchronous packets characterized by the absence of a requirement that an unarbitrated response or ack packet be sent in response to transmission of a packet of the first type, wherein a second type of packet comprises asynchronous packets, the method comprising:
   if there is a packet of the second type to be sent, then concatenating the packet of the second type to a plurality of packets of the first type and sending the plurality of packets of the first type followed by the concatenated packet of the second type; and
   if there is no packet of the second type to be sent, then concatenating a bogus ack packet to the plurality of packets of the first type and sending the plurality of packets of the first type followed by the concatenated bogus ack packet.

2. The method of claim 1, wherein concatenating the packet of the second type is performed by link hardware.

3. The method of claim 1, wherein concatenation of the bogus ack packet is performed by link hardware.

4. The method of claim 1, wherein concatenation of the bogus ack packet is performed by PHY hardware.

5. The method of claim 4, wherein link hardware is unaware that the PHY hardware performs concatenation.

6. The method of claim 1, further comprising inspecting a first quadlet of a packet to determine a packet type.

7. The method of claim 6, wherein the first quadlet contains a transaction code, further comprising:
   determining from the transaction code that the packet is a stream packet; and
   determining that transmission is not occurring during an isochronous period.

8. A method for administering a serial bus, the bus facilitating communication between node devices connected to the bus and communicating over the bus in the form of packetized communication between said node devices, wherein a first type of packet comprises asynchronous packets characterized by the absence of a requirement that an unarbitrated response or ack packet be sent in response to transmission of a packet of the first type, wherein a second type of packet comprises asynchronous packets, the method comprising:
   receiving a packet of the first type;
   determining that there are no packets of the second type to be sent;
   if fly-by concatenation is permitted then concatenating a bogus ack packet to the received packet and sending the received packet and the bogus ack packet; and
   if fly-by concatenation is not permitted then sending the received packet, arbitrating for the bus, and sending a bogus ack packet.

9. The method of claim 8, wherein concatenating the bogus ack packet is performed by PHY hardware.

10. The method of claim 8, wherein arbitrating for control of the bus is performed by PHY hardware.

11. The method of claim 8, further comprising inspecting a first quadlet of a packet to determine a packet type.

12. The method of claim 11, wherein the first quadlet contains a transaction code, further comprising:
   determining from the transaction code that the packet is a stream packet; and
   determining that transmission is not occurring during an isochronous period.

13. A method for administering a data bus, the bus facilitating communication between node devices communicating over the bus using at least a first type and second type of asynchronous packet, the first type of packet not requiring that an acknowledgement packet be sent in response to transmission of such first type of packet, the method comprising:
   if a packet of the second type needs to be sent, concatenating the packet of the second type to a plurality of packets of the first type and sending the plurality of packets of the first type followed by the concatenated packet of the second type; and
   if no packet of the second type needs to be sent, concatenating a false acknowledgement packet to the plurality of packets of the first type and sending the plurality of packets of the first type followed by the concatenated false acknowledgement packet.

14. The method of claim 13, wherein concatenating the packet of the second type is performed by link hardware.

15. The method of claim 13, wherein concatenation of the false acknowledgement packet is performed by link hardware.

16. The method of claim 13, wherein concatenation of the false acknowledgement packet is performed by PHY hardware.

17. The method of claim 16, wherein link hardware is unaware that the PHY hardware performs concatenation.

18. The method of claim 13, further comprising inspecting a first quadlet of a packet to determine a packet type.

19. The method of claim 18, wherein the first quadlet contains a transaction code, further comprising:
   determining from the transaction code that the packet is a stream packet; and
   determining that transmission is not occurring during an isochronous period.

20. A method for administering a data bus, the bus facilitating communication between node devices communicating over the bus using at least a first type of asynchronous packet and a second type of asynchronous packet, the first type of packet having no requirement that a response packet be sent in response to transmission thereof, the method comprising:
   receiving a packet of the first type;
   determining that there are no packets of the second type to be sent;
   if concatenation is permitted, concatenating a false response packet to the received packet and sending the received packet and the false response packet; and
   if concatenation is not permitted, sending the received packet, arbitrating for the bus, and sending a false response packet.

21. The method of claim 20, wherein concatenating the false response packet is performed by PHY hardware.

22. The method of claim 20, wherein arbitrating for control of the bus is performed by PHY hardware.

23. The method of claim 20, further comprising inspecting a first quadlet of a packet to determine a packet type.

24. The method of claim 23, wherein the first quadlet contains a transaction code, further comprising:
   determining from the transaction code that the packet is a stream packet; and
   determining that transmission is not occurring during an isochronous period.

25. A node device adapted to administer a data bus, the bus facilitating communication between said node device and another device communicating over the bus using at least a first type and second type of asynchronous packet, the first type of packet not requiring that an acknowledgement packet be sent in response to transmission of such first type of packet, the node device comprising first apparatus adapted to:
   determine if a packet of the second type needs to be sent, and if so, concatenate the packet of the second type to a plurality of packets of the first type, and send the plurality of packets of the first type followed by the concatenated packet of the second type; and
   if no packet of the second type needs to be sent, concatenate a false acknowledgement packet to the plurality of packets of the first type, and send the plurality of packets of the first type followed by the concatenated false acknowledgement packet.

26. The node device of claim 25, further comprising link hardware adapted to concatenate the packet of the second type.

27. The node device of claim 25, further comprising link hardware adapted to concatenate the false acknowledgement packet.

28. The node device of claim 25, further comprising PHY hardware adapted to concatenate the false acknowledgement packet.

29. The node device of claim 25, further comprising apparatus adapted to inspect a first quadlet of a packet to determine a packet type, the first quadlet containing a transaction code.

30. The node device of claim 29, further comprising apparatus adapted to:
   determine from the transaction code that the packet is a stream packet; and
   determine that transmission is not occurring during an isochronous period.

31. A non-transitory computer readable medium containing instructions which, when executed by a computer, administer a serial bus that facilitates communication between node devices connected to the bus and communicating over the bus in the form of packetized communication between the node devices, wherein a first type of packet comprises asynchronous packets characterized by the absence of a requirement that an unarbitrated response or ack packet be sent in response to transmission of a packet of the first type, wherein a second type of packet comprises asynchronous packets, by performing the acts of:
   if there is a packet of the second type to be sent, then concatenating the packet of the second type to a plurality of packets of the first type and sending the plurality of packets of the first type followed by the concatenated packet of the second type; and
   if there is no packet of the second type to be sent, then concatenating a bogus ack packet to the plurality of packets of the first type and sending the plurality of packets of the first type followed by the concatenated bogus ack packet.

32. The non-transitory computer readable medium of claim 31, further comprising instructions which, when executed by a computer, instruct link hardware to perform concatenation of the packet of the second type.

33. The non-transitory computer readable medium of claim 31, further comprising instructions which, when executed by a computer, instruct link hardware to perform concatenation of the bogus ack packet.

34. The non-transitory computer readable medium of claim 31, further comprising instructions which, when executed by a computer, instruct PHY hardware to perform concatenation of the bogus ack packet.

35. The non-transitory computer readable medium of claim 34, further comprising instructions which, when executed by a computer, instruct link hardware to be unaware that PHY hardware performs concatenation.

36. The non-transitory computer readable medium of claim 31, further comprising instructions which, when executed by a computer, inspect a first quadlet of a packet to determine a packet type.

37. The non-transitory computer readable medium of claim 36, further comprising instructions which, when executed by a computer, determine from a transaction code of the first quadlet:
   that the packet is a stream packet; and
   that transmission is not occurring during an isochronous period.

38. A non-transitory computer readable medium containing instructions which, when executed by a computer, administer a serial bus that facilitates communication between node devices connected to the bus and communicating over the bus in the form of packetized communication between the node devices, wherein a first type of packet comprises asynchronous packets characterized by the absence of a requirement that an unarbitrated response or ack packet be sent in response to transmission of a packet of the first type, wherein a second type of packet comprises asynchronous packets, by performing the acts of:
   receiving a packet of the first type;
   determining that there are no packets of the second type to be sent;
   if fly-by concatenation is permitted then concatenating a bogus ack packet to the received packet and sending the received packet and the bogus ack packet; and
   if fly-by concatenation is not permitted then sending the received packet, arbitrating for the bus, and sending a bogus ack packet.

39. The non-transitory computer readable medium of claim 38, further comprising instructions which, when executed by a computer, instruct link hardware to concatenate the packet of the second type.

40. The non-transitory computer readable medium of claim 38, further comprising instructions which, when executed by a computer, instruct link hardware to concatenate the bogus ack packet.

41. The non-transitory computer readable medium of claim 38, further comprising instructions which, when executed by a computer, instruct PHY hardware to concatenate the bogus ack packet.

42. The non-transitory computer readable medium of claim 41, further comprising instructions which, when executed by a computer, instruct link hardware to be unaware that PHY hardware performs concatenation.

43. The non-transitory computer readable medium of claim 38, further comprising instructions which, when executed by a computer, inspect a first quadlet of a packet to determine a packet type.

44. The non-transitory computer readable medium of claim 43, further comprising instructions which, when executed by a computer, determine from a transaction code of the first quadlet:
   that the packet is a stream packet; and
   that transmission is not occurring during an isochronous period.

45. The non-transitory computer readable medium of claim 38, further comprising instructions which, when executed by a computer, instruct PHY hardware to arbitrate for control of the bus.

46. A node device connected to a serial bus, the node device comprising a non-transitory computer readable medium comprising instructions which, when executed by a computer, administer a serial bus that facilitates communication between the node device and a plurality of node devices connected to the bus and communicating over the bus in the form of packetized communication between the node device and the plurality of node devices, wherein a first type of packet comprises asynchronous packets characterized by the absence of a requirement that an unarbitrated response or ack packet be sent in response to transmission of a packet of the first type, wherein a second type of packet comprises asynchronous packets, by performing the acts of:
   if there is a packet of the second type to be sent, then concatenating the packet of the second type to a plurality of packets of the first type and sending the plurality of packets of the first type followed by the concatenated packet of the second type; and
   if there is no packet of the second type to be sent, then concatenating a bogus ack packet to the plurality of packets of the first type and sending the plurality of packets of the first type followed by the concatenated bogus ack packet.

47. The node device of claim 46, comprising link hardware configured to concatenate the packet of the second type.

48. The node device of claim 46, comprising link hardware configured to concatenate the bogus ack packet.

49. The node device of claim 46, comprising PHY hardware configured to concatenate the bogus ack packet.

50. The node device of claim 49, wherein the link hardware is unaware that PHY hardware performs concatenation.

51. The node device of claim 46, comprising a non-transitory computer readable medium, comprising instructions which, when executed by a computer, inspect a first quadlet of a packet to determine a packet type.

52. The node device of claim 51, wherein the non-transitory computer readable medium, further comprises instructions which, when executed by a computer, determine from a transaction code of the first quadlet:
    that the packet is a stream packet; and
    that transmission is not occurring during an isochronous period.

53. A node device connected to a serial bus, the node device comprising a non-transitory computer readable medium comprising instructions which, when executed by a computer, administer a serial bus that facilitates communication between the node device and a plurality of node devices connected to the bus and communicating over the bus in the form of packetized communication between the node device and the plurality of node devices, wherein a first type of packet comprises asynchronous packets characterized by the absence of a requirement that an unarbitrated response or ack packet be sent in response to transmission of a packet of the first type, wherein a second type of packet comprises asynchronous packets, by performing the acts of:
    receiving a packet of the first type;
    determining that there are no packets of the second type to be sent;
    if fly-by concatenation is permitted then concatenating a bogus ack packet to the received packet and sending the received packet and the bogus ack packet; and
    if fly-by concatenation is not permitted then sending the received packet, arbitrating for the bus, and sending a bogus ack packet.

54. The node device of claim 53, comprising link hardware configured to concatenate the packet of the second type.

55. The node device of claim 53, comprising link hardware configured to concatenate the bogus ack packet.

56. The node device of claim 53, comprising PHY hardware configured to concatenate the bogus ack packet.

57. The node device of claim 56, wherein the link hardware is unaware that PHY hardware performs concatenation.

58. The node device of claim 53, comprising a non-transitory computer readable medium, comprising instructions which, when executed by a computer, inspect a first quadlet of a packet to determine a packet type.

59. The node device of claim 58, wherein the non-transitory computer readable medium, further comprises instructions which, when executed by a computer, determine from a transaction code of the first quadlet:
    that the packet is a stream packet; and
    that transmission is not occurring during an isochronous period.

60. The node device of claim 53, comprising a non-transitory computer readable medium, comprising instructions which, when executed by a computer, instruct PHY hardware to arbitrate for control of the bus.

61. A node device for administering a data bus, the bus facilitating communication between the node device and another device communicating over the bus using at least a first type of asynchronous packet and a second type of asynchronous packet, the first type of packet having no requirement that a response packet be sent in response to transmission thereof, the node device comprising apparatus adapted to:
    receive a packet of the first type;
    determine that there are no packets of the second type to be sent;
    if concatenation is permitted, concatenate a false response packet to the received packet, and send the received packet and the false response packet; and
    if concatenation is not permitted, send the received packet, arbitrate for the bus, and send the false response packet.

62. The node device of claim 61, further comprising link hardware adapted to concatenate the packet of the second type.

63. The node device of claim 61, further comprising link hardware adapted to concatenate the false acknowledgement packet.

64. The node device of claim 61, further comprising PHY hardware adapted to concatenate the false acknowledgement packet.

65. The node device of claim 61, further comprising apparatus adapted to inspect a first quadlet of a packet to determine a packet type, the first quadlet containing a transaction code.

66. The node device of claim 65, further comprising apparatus adapted to:
    determine from the transaction code that the packet is a stream packet; and
    determine that transmission is not occurring during an isochronous period.

67. The node device of claim 61, further comprising PHY hardware adapted to arbitrate for control of the bus.

* * * * *